Figure 5:
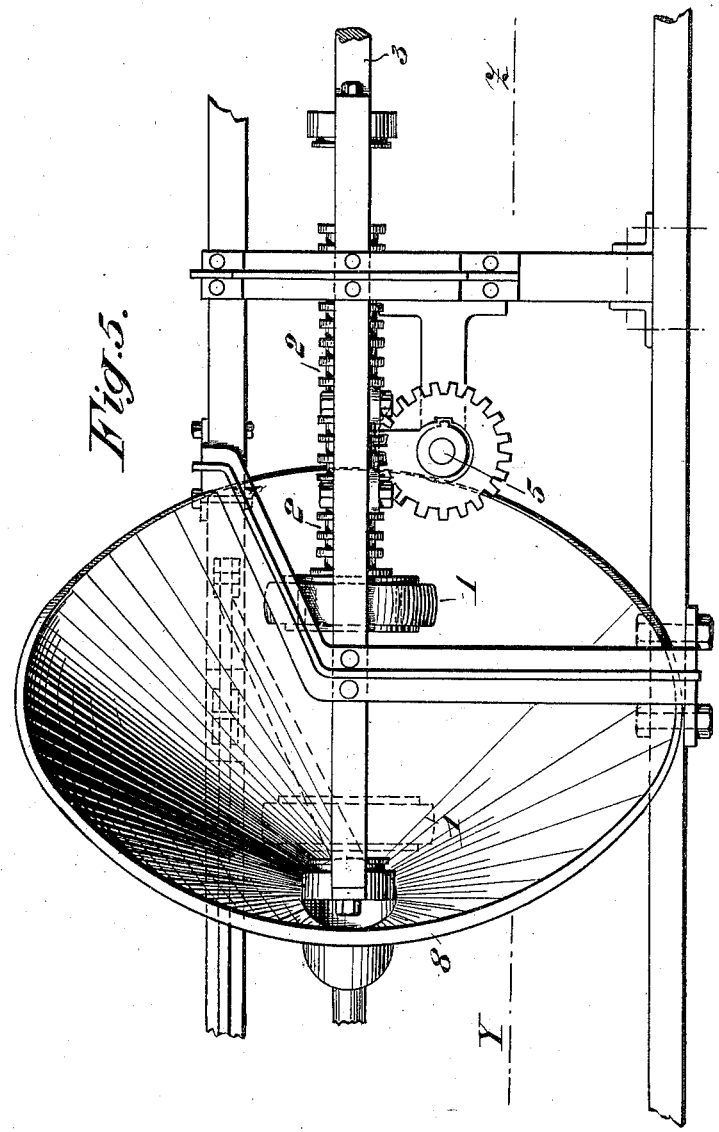

No. 687,880. Patented Dec. 3, 1901.
G. A. HERCHER.
POWER TRANSMISSION DEVICE.
(Application filed Mar. 15, 1901.)
(No Model.) 4 Sheets—Sheet 1.
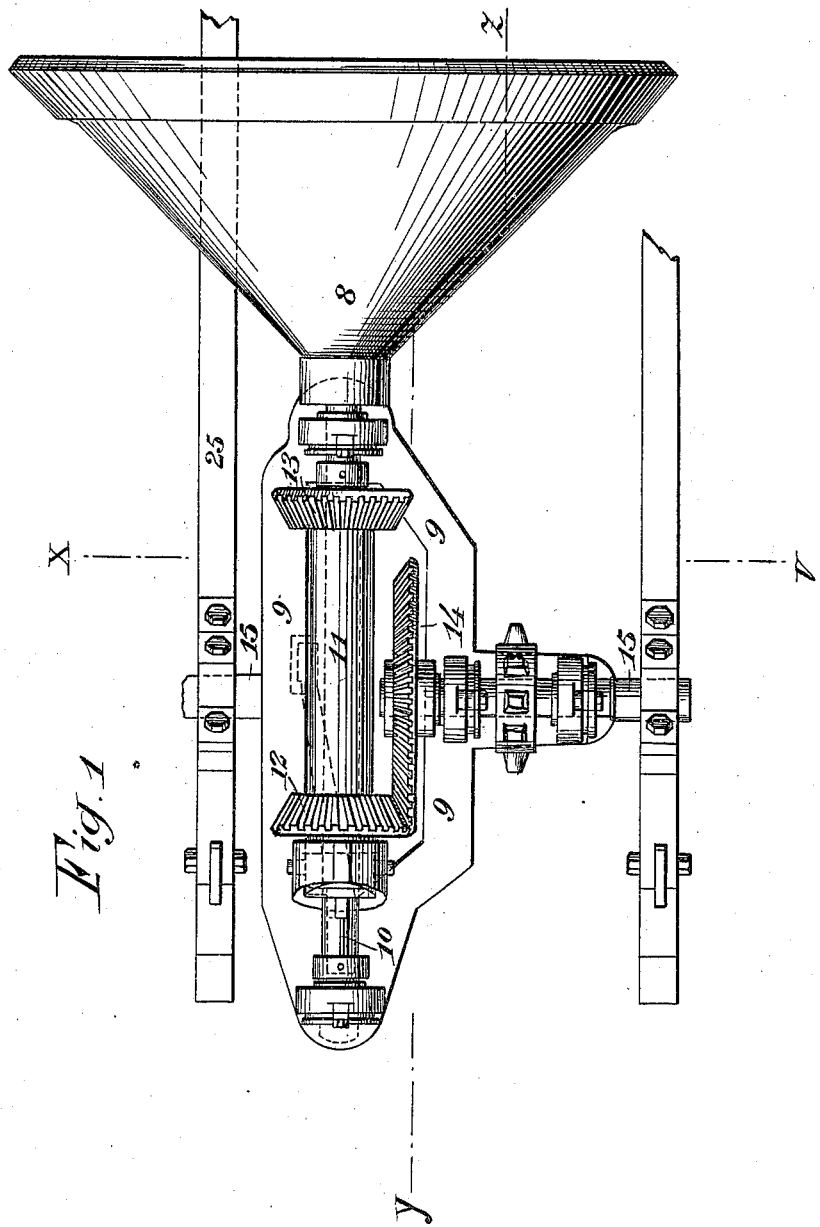
Witnesses:
T. D. McMahon.
G. S. Noble
Inventor,
Gaston Alexandre Hercher,
by B. Singer Att'y.

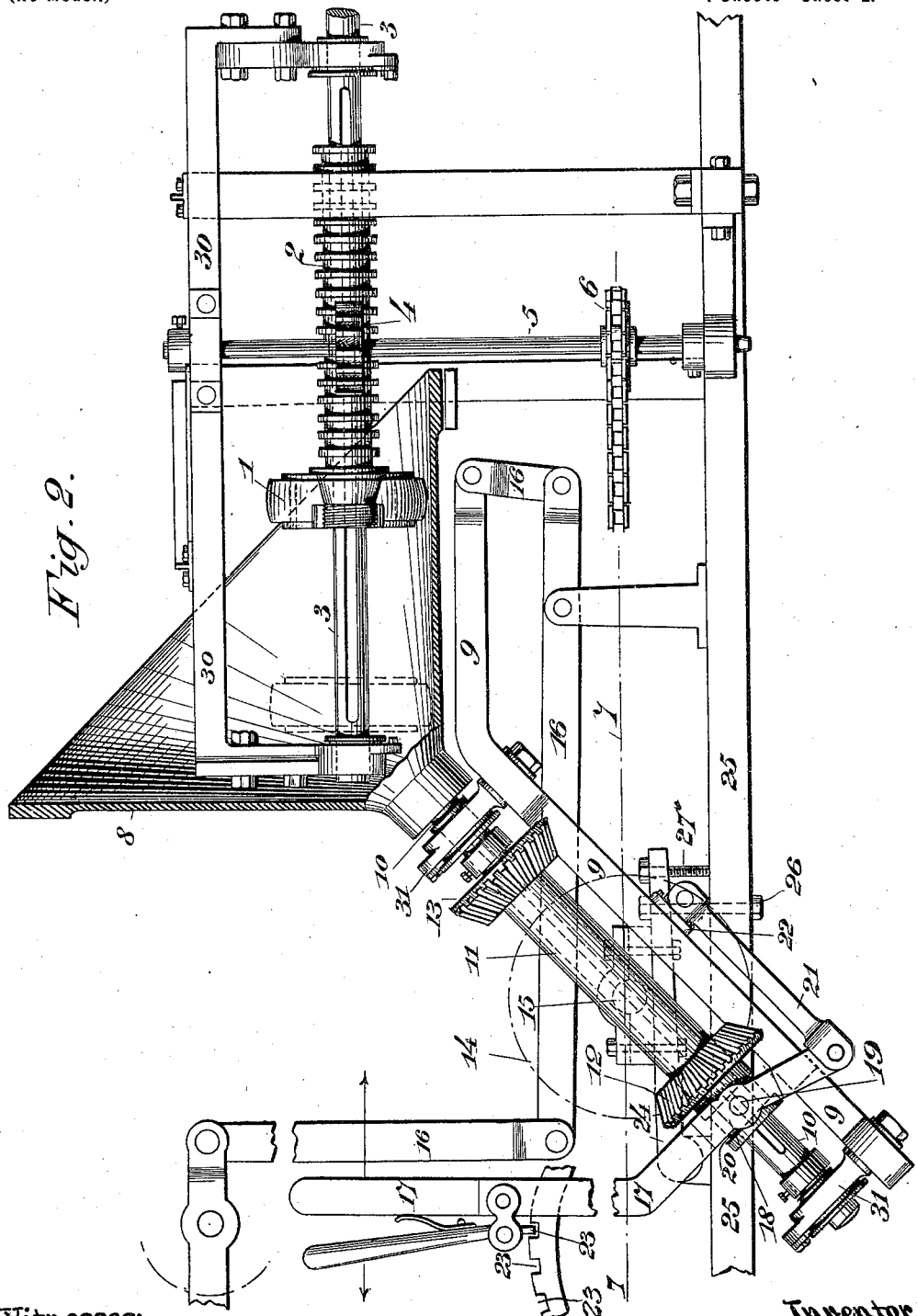

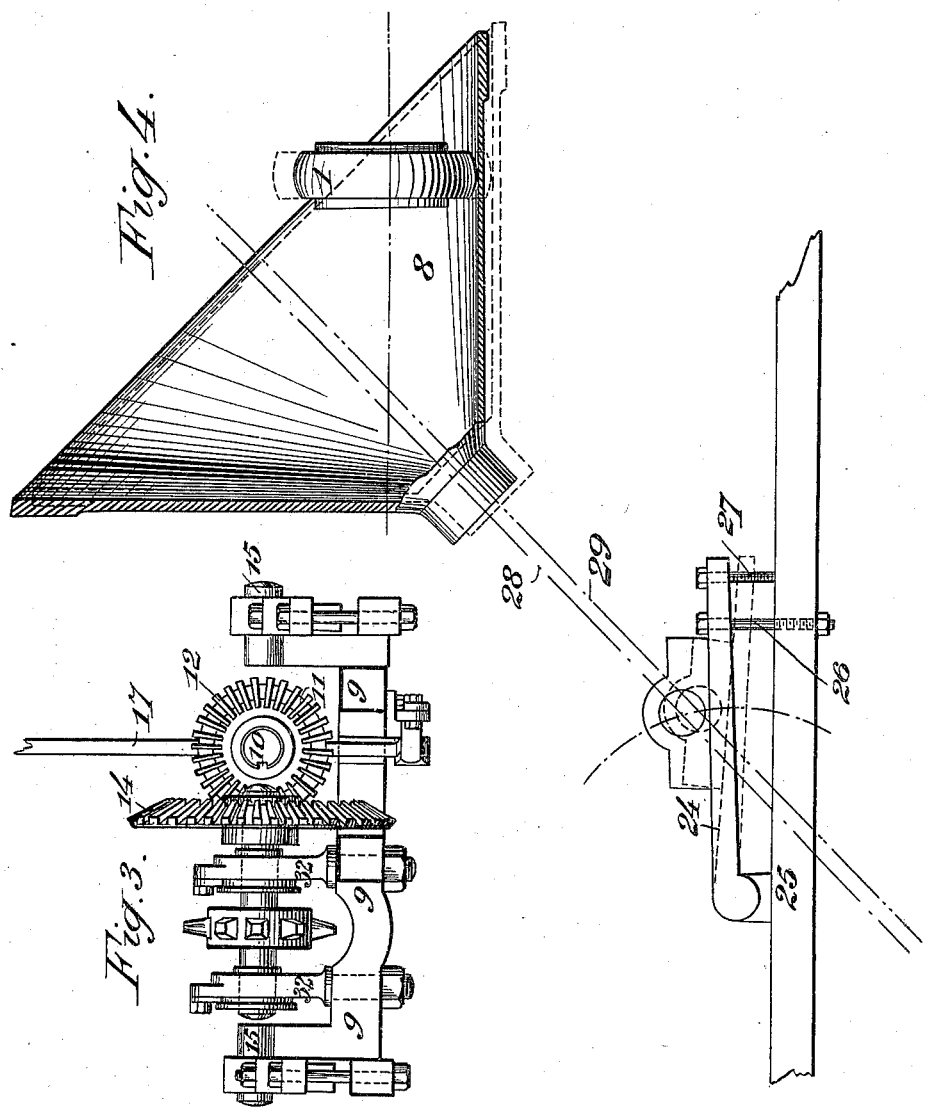

No. 687,880. Patented Dec. 3, 1901.
G. A. HERCHER.
POWER TRANSMISSION DEVICE.
(Application filed Mar. 15, 1901.)

(No Model.) 4 Sheets—Sheet 4.

Witnesses:
J. D. McMahon.
G. S. Noble

Inventor,
Gaston Alexandre Hercher
by B. Singer
Att'y.

UNITED STATES PATENT OFFICE.

GASTON ALEXANDRE HERCHER, OF ROUEN, FRANCE.

POWER-TRANSMISSION DEVICE.

SPECIFICATION forming part of Letters Patent No. 687,880, dated December 3, 1901.

Application filed March 15, 1901. Serial No. 51,337. (No model.)

*To all whom it may concern:*

Be it known that I, GASTON ALEXANDRE HERCHER, a citizen of the Republic of France, and a resident of Rouen, France, have invented certain new and useful Improvements in Power-Transmission Devices, of which the following is a specification.

My present invention relates to improvements in power-transmission devices specially applicable to motor-cars, boats, and the like, the object being to provide a progressive change of speed effected by friction, as will be hereinafter fully described with reference to the accompanying drawings, wherein—

Figure 1 is a plan view showing the clutch device forming a part of the apparatus. Fig. 2 is an elevation of the apparatus with parts shown in section on line Y Z, Fig. 1. Fig. 3 is a section on line V X, Fig. 1. Fig. 4 is a diagram showing the relative positions of the cone for different-sized driving-wheels. Fig. 5 is a plan view of the driving device.

The invention consists in the peculiar construction and arrangement of parts that will be hereinafter described.

Referring to the drawings, 1, Fig. 2, represents the roller, formed of bands or strips of cloth covered with india-rubber and wound upon each other and held in position by means of disks made of leather. Said roller is secured to the end of a socket 2, mounted on the drive-shaft 3, actuated by the motor. The drive-shaft is provided with a longitudinal rib adapted to engage a corresponding groove on the inner surface of the sleeve or socket 2. The latter has circular rack-teeth and may be engaged by a gear-wheel 4 to be moved longitudinally on the drive-shaft 3. The gear-wheel 4 is keyed on a shaft 5, actuated by means of a sprocket-wheel 6 and a chain 7, connected to the steering mechanism and adapted to be actuated by means of a handle, whereby the roller 1 may be adjusted and held in any desired position.

When the parts are in engagement, the roller 1 is in contact with the inner surface of the friction-cone 8 and causes the latter to rotate. Said cone is preferably made of metal and arranged, by means of the frame 9, so that its friction-line is always in a horizontal plane parallel to the shaft 3, as clearly shown in Fig. 2.

The cone 8 is mounted on the end of the shaft 10, carrying a sleeve 11, provided with two bevel gear-wheels 12 and 13, one of which meshes with a bevel gear-wheel 14, actuating the sprocket-pinion connected by means of a chain to the supporting-wheels of the vehicle when the invention is applied to motor-cars or the like.

The frame 9 is provided with two journals 15 15, so that it may be tilted by means of levers 16 16 to bring the cone 8 into or out of contact with the roller 1. These levers provide one means for engaging or disengaging the said friction roller and cone. Other means for this purpose and by the operation of which the direction of rotation of the driven shaft may be varied are also provided. These last said means include a shaft 10, which is provided with a longitudinal rib adapted to slide in a corresponding groove provided on the inner bore of the sleeve 11, adapted to slide on the shaft 10. Said sleeve is operated by means of a lever 17, having an eye 18 surrounding the sleeve 11 and carrying the latter with it by means of two pins 19, engaging a circular groove 20 at the end of said sleeve. The lever 17 is pivotally connected at its end to a link 21, pivotally connected to a bracket 22, secured to the frame 9. The lever 17 may be adjusted and held in three different positions by means of three notches 23, engaged by a suitable stop connected to the lever 17. When the vehicle is to be moved forwardly, the sleeve 11 is brought by means of the lever in such a position that the toothed pinion 12 meshes with the wheel 14. This position of the lever is shown in Fig. 2.

When the parts are to be disengaged, the lever 17 is brought to the second notch, whereby the sleeve 11 is moved to such a position that the toothed pinions 12 and 13 do not mesh with the wheel 14.

When the vehicle is to be moved backwardly, the lever 17 is brought to the third notch, whereby the sleeve 11 is brought to such a position that the toothed pinion 13 meshes with the wheel 14.

The speed may be changed by changing the diameter of the roller 1.

In order to enable larger or smaller rollers to be mounted on the sleeve 2, it is essential to modify the position of the friction-cone 8, To this end the bearings of the journals 15 15 of the frame 9 are secured to a tilting support 24, arranged on the frame 25 and pivotally connected at one end to the latter, while the opposite ends of the levers forming said support are held by means of a bolt 26, extending freely through said frame. At the end of each lever is provided an adjusting-screw 27, Figs. 2 and 4. When the speed is to be increased, a larger roller is substituted for the one in use. For this purpose the screws 27 are loosened, whereby the supporting-levers are brought to the position indicated in dotted lines in Fig. 4. Said levers are held in this position by tightening the nut of the bolt 26. Thus the axis 28 of the cone 8 will be brought to the position 29, parallel to the former, whereby a larger roller may be used on the drive-shaft.

30 represents the bearing of the drive-shaft, and 31 31 are the bearings of the shaft 10, and 32 designate the bearings of the driven shaft.

Having fully described my invention, what I claim, and desire to secure by Letters Patent, is—

1. In a power-transmission device, the combination with a drive-shaft, and a friction-roller mounted on said shaft, of a transmission-shaft, a cone carried by said shaft and having a surface extending in a plane parallel to the drive-shaft and adapted to be engaged by said friction-roller, and means for adjusting said cone relatively to the drive-shaft and holding it at any desired distance therefrom, whereby friction-rollers of different diameters may be employed.

2. In a power-transmission device, the combination with a drive-shaft, and a friction-roller mounted thereon, of a transmission-shaft provided with a cone adapted to contact with said friction-roller, a driven shaft; two bevel-gears mounted on the transmission-shaft on opposite sides of the axis of the driven shaft and adapted to drive the last said shaft in opposite directions, means for so adjusting said bevel-gears on the transmission-shaft that either may drive the driven shaft or both be disengaged therefrom, and independent means for adjusting the transmission-shaft and parts supported thereby to separate the cone and friction-wheel.

3. In a power-transmission device, the combination with the drive-shaft and an adjustable friction-roller on said shaft, of the transmission-shaft, a hollow cone on the latter and the surface of which is adapted to be frictionally engaged by said roller, means for adjusting said roller on the drive-shaft within the hollow friction-cone, a longitudinally-movable sleeve keyed on the transmission-shaft, two gear-wheels fast on said sleeve, a third gear-wheel with which the former may be meshed and to which power is to be transmitted, and means for actuating and holding said sleeve, in adjusted positions, substantially as set forth.

4. In a power-transmission device, the combination with the drive-shaft and an adjustable friction-roller on said shaft, of the transmission-shaft, a hollow cone on the latter and the surface of which is adapted to be frictionally engaged by said roller, means for adjusting said roller on the drive-shaft within the hollow friction-cone, a tilting frame in which said transmission-shaft is journaled, and means for tilting and holding said frame in adjusted positions, substantially as set forth.

5. In a power-transmission device, the combination, with the drive-shaft and an adjustable friction-roller on said shaft, of the transmission-shaft, a hollow cone on the latter and the surface of which is adapted to be frictionally engaged by said roller, means for adjusting said roller on the drive-shaft within the hollow friction-cone, a longitudinally-movable sleeve keyed on the transmission-shaft, two gear-wheels fast on said sleeve, a third gear-wheel with which the former may be meshed and to which power is to be transmitted, means for actuating and holding said sleeve, in adjusted positions, a tilting frame in which said transmission-shaft is journaled and means for tilting and holding said frame in adjusted positions, substantially as set forth.

6. In a power-transmission device, the combination with the drive-shaft and an adjustable interchangeable friction-roller on said shaft, of the transmission-shaft, a hollow cone on the latter and the surface of which is adapted to be frictionally engaged by said roller, means for adjusting said roller on the drive-shaft within the hollow friction-cone, a tilting frame in which said transmission-shaft is journaled, and means for tilting and holding said frame in adjusted positions, substantially as set forth.

In testimony whereof I have hereunto set my hand in presence of two witnesses.

GASTON ALEXANDRE HERCHER.

Witnesses:
M. LAPOSTOL DE VILLENEUVE,
Mrs. THORNWELL HAYNES.